April 28, 1953  E. J. WHITNEY  2,636,335
RAKING AND WINDROW TURNING MACHINE
Filed Oct. 31, 1949  2 SHEETS—SHEET 2
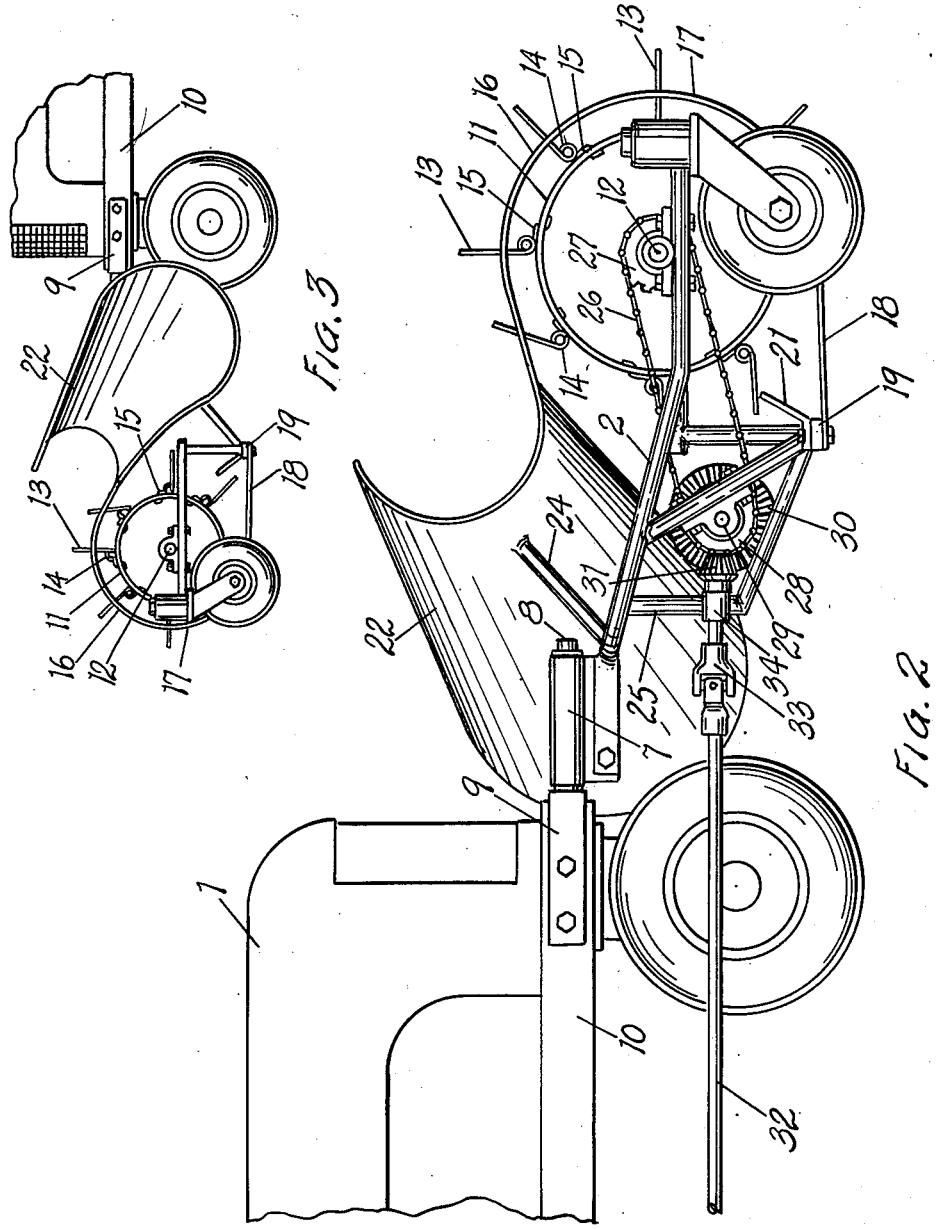
INVENTOR.
E. J. Whitney
BY
Otto A. Earl
Attorney.

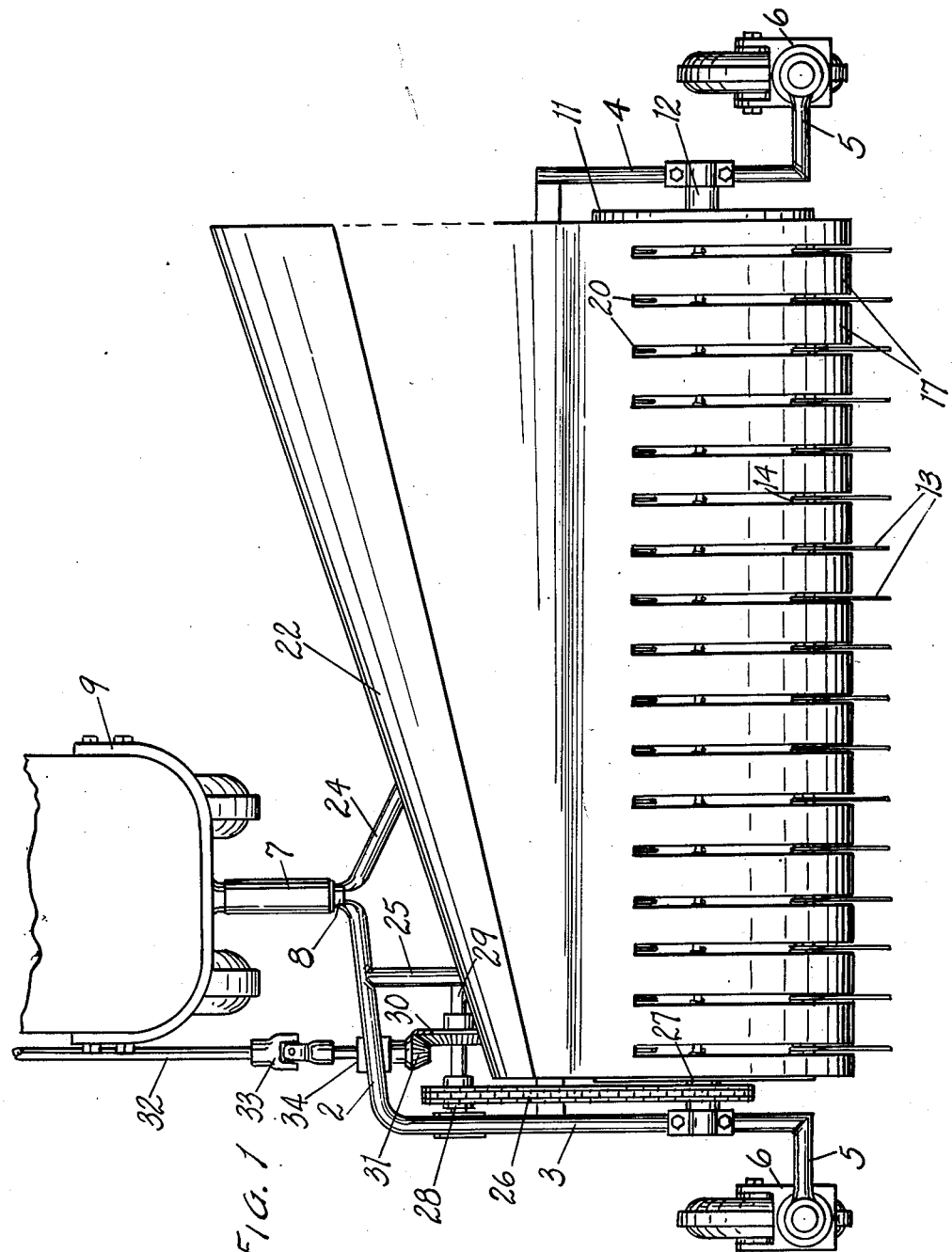

Patented Apr. 28, 1953

2,636,335

UNITED STATES PATENT OFFICE 2,636,335

RAKING AND WINDROW TURNING MACHINE

Edwin Jay Whitney, Manhattan, Kans.

Application October 31, 1949, Serial No. 124,639

10 Claims. (Cl. 56—370)

This invention relates to improvements in raking and windrow turning machines.

The main objects of this invention are:

First, to provide a machine which is highly efficient in the raking of hay, straw and other like material or for use in turning windrows of previously raked material which may have become wet or to facilitate the drying thereof.

Second, to provide a machine of this character which may be readily attached to and driven from a tractor and is effective in picking up material without gathering up stones and other relatively heavy objects.

Third, to provide a structure having these advantages which is comparatively simple and economical in its parts.

Objects relating to details and economics of the invention will appear from the description to follow. The invention is pointed out in the claims.

A preferred embodiment of the invention is illustrated in the accompanying drawings, in which:

Fig. 1 is a top plan view of a machine or apparatus embodying my invention shown in operative relation to a propelling tractor.

Fig. 2 is a fragmentary side elevation viewed from the left hand of Fig. 1.

Fig. 3 is a fragmentary reduced side elevation viewed from the right of Fig. 1.

In the accompanying drawing 1 represents a tractor. The machine of my invention comprises a frame designated generally by the numeral 2 and having side members 3 and 4 provided with laterally turned arms 5 at their front ends, caster wheels assemblies or units 6 mounted at the outer ends of the arms. The frame 2 is provided with a swivel coupling element 7 supportedly mounted on the forwardly projecting push bar 8 secured to the tractor by the supporting yoke 9, this supporting yoke being in effect a part of the machine, the yoke being designed to fit a frame part 10 of a tractor with which the machine is to be used.

An elongated drum 11 is provided with journals 12 mounted in suitable bearings on the side members 3 and 4 of the frame. These bearings are rearwardly spaced from the laterally projecting caster wheels carrying arms 5 of the frame. The drum is provided with a plurality of axially spaced annular series of pickup fingers 13 which have spring coils 14 adjacent their connections 15 to the drum. The fingers of each series are angularly spaced around the drum. The coils 14 provide a springable support for the fingers which acts to normally hold them in radial relation to the drum but permits their yielding in the event of their striking an obstruction when in pickup position and also in engaging stripper elements as will be hereinafter described.

The side delivery apron 16 has a downwardly curved front portion partially overhanging and disposed in concentric relation to the drum. This apron is provided with a plurality of forwardly curved carrier or guard fingers 17 which overhang and extend downwardly at the front of the drum in concentric spaced relation thereto. The members 17 are spaced to receive the pickup fingers between them. The rear ends of the members 17 are extended rearwardly at 18 below the drum and secured to a crossbar 19 on the frame. These rearward extensions 18 are supported in the plane above the surface contacting portions of the caster carrying wheels or above the ends of the pickup fingers when in pickup position.

As the drum rotates in counterclockwise direction the fingers are brought into engagement with the stripper elements 20 constituted in the embodiment illustrated by front edge portions of the apron between the carrier members 17. These stripper elements are so positioned that the fingers engage them with a wiping tilting action as is indicated in Fig. 2. To further insure the clearing of the fingers I provide a stripper bar 21 which is mounted on the crosspiece 19 of the frame to be engaged by the fingers, as also shown in Fig. 2, before they pass between the rearwardly projecting ends 18 of the guard or carrier members 19.

The hay or other material is picked up by the fingers as the machine travels over the surface and delivered upon the apron. The apron 16 is extended rearwardly into a forwardly facing generally conical chute 22 which is laterally inclined downwardly toward the delivery end thereof and also inclined rearwardly or the rear wall portion of the chute is rearwardly inclined. This delivery chute portion of the apron is of general conical scroll-like form, its bottom merging into the front portion of the apron overhanging the drum and as stated desirably concentric thereto so that the material picked up by the fingers is pushed onto the apron and into the chute portion thereof, the delivery of the successively discharging fingers causing the material to slide endwise of the apron and to be discharged sidewise of the machine into a windrow. The more or less entangling of the stalks also tends to pull the raked or turned material from the apron. The apron and the carrier members are preferably formed of a single sheet of sheet metal.

The frame is provided with apron supporting brackets 24 and it is further supported by securing to the upright portion 25 of the frame. Also the securing of the rearwardly extending portions of the bar 17 constitutes a support for the front portion of the apron while providing clearance for the rotation of the drum and pickup fingers carried thereby.

In the embodiment illustrated the drum is driven in a counterclockwise direction by means of the sprocket chain 26 coacting with a sprocket 27 on one of the journals of the drum, the sprocket chain engaging a sprocket 28 mounted on the shaft 29 carried by the carriage frame, the shaft having a beveled gear 30 thereon with which the beveled driving pinion 31 of the propeller shaft 32 is engaged. This propeller shaft is provided with a universal joint 33, the forward end of the propeller shaft being mounted on the carriage frame at 34. The drive connection is such as to drive the drum in a counterclockwise direction. With this arrangement hay, straw or other like material may be effectively picked up and discharged into a windrow at the side of the machine.

In the event a windrow requires turning, either as the result of rain or to facilitate drying, the machine may be driven lengthwise of the windrow, picking up the material from the windrow and effectively loosening and turning it and discharging it into another windrow. Machines embodying my invention are highly efficient for both purposes and at the same time are comparatively simple and economical in structure and are strong and durable. Another advantage is that either when operated to rake or pick up material from a swath or from a windrow the machine is not likely to become clogged.

I have illustrated and described my invention in a highly practical embodiment thereof. I have not attempted to illustrate or describe other embodiments, adaptations or modifications which I contemplate as it is believed that this disclosure will enable those skilled in the art to embody or adapt my invention as may be desired.

Having thus described my invention, what I claim as new and desire to secure by Letters Patent is:

1. In an apparatus of the class described, the combination with a carriage, a drum rotatably mounted on said carriage and provided with a plurality of axially spaced annular series of pickup fingers springably connected thereto to normally project radially therefrom, a side delivery apron having a downwardly curved front portion disposed in generally concentric overhanging spaced relation to said drum, and having a plurality of forwardly curved carrier members extending over and downwardly at the front of and in general concentric spaced relation to said drum and spaced to receive the series of pickup fingers between them as the drum is rotated, the fingers engaging said apron at the inner ends of the carrier members with a finger deflecting stripping action, said apron being extended rearwardly into a conical upwardly and forwardly facing scroll-like delivery chute portion, and means for rotating the drum with the upper portion thereof moving rearwardly, said chute portion being inclined downwardly and rearwardly from one side of the carriage to the opposite side thereof to deliver downwardly and rearwardly to one side of the carriage, said apron front and chute portions being of sheet material and integral with each other and curvedly merging into each other, said chute portion being disposed rearward of and adjacent the drum for delivery by said pick up fingers directly into said chute portion as said pickup fingers move rearwardly with the upper portion of the drum, the lower end of the chute portion delivering therefrom at a level substantially below that of the top of the drum.

2. In an apparatus of the class described, the combination with a carriage, a drum rotatably mounted on said carriage and provided with a plurality of axially spaced annular series of pickup fingers, a side delivery apron having a downwardly curved front portion disposed in generally concentric overhanging spaced relation to said drum, and having a plurality of forwardly curved carrier members extending over and downwardly at the front of and in general concentric spaced relation to said drum and spaced to receive the series of pickup fingers between them as the drum is rotated, said apron being extended rearwardly into a conical upwardly and forwardly facing scroll-like delivery chute portion, and means for rotating the drum with the upper portion thereof moving rearwardly, said chute portion being inclined downwardly and rearwardly from one side of the carriage to the opposite side theref to deliver downwardly and rearwardly to one side of the carriage, said apron and chute portions being of sheet material and curvedly merging into each other adjacent the drum for delivery by said pickup fingers directly into said chute portion, as the pickup fingers move rearwardly with upper portion of the drum.

3. In an apparatus of the class described, the combination with a carriage, a drum rotatably mounted on said carriage and provided with a plurality of axially spaced annular series of pickup fingers, a side delivery apron having a downwardly curved front portion disposed in generally concentric overhanging spaced relation to said drum, and having a plurality of forwardly curved carrier members extending over and downwardly at the front of and in general concentric spaced relation to said drum and spaced to receive the series of pickup fingers between them as the drum is rotated, said carrier members extending below and rearwardly of the drum, said apron being extended rearwardly into a conical upwardly and forwardly facing scroll-like delivery chute portion, and means for rotating the drum with the upper portion thereof moving rearwardly, said chute portion being inclined downwardly and rearwardly from one side of the carriage to the opposite side thereof to deliver downwardly and rearwardly to one side of the carriage, said apron front and chute portions being of sheet material and merging into each other adjacent the rear of the drum for delivery by said pickup fingers substantially directly into the chute portion as the pickup fingers move rearwardly with the upper portion of the drum.

4. In an apparatus of the class described, the combination with a carriage, of an elongated drum rotatably mounted on said carriage and provided with a plurality of axially spaced annular series of pickup fingers springably connected thereto to normally project radially therefrom, a side delivery apron having a front portion disposed in overhanging relation to said drum, and provided with a plurality of carrier members extending over and downwardly at the front of and in general concentric spaced relation to said drum and spaced to receive the series of pickup fingers between them as the drum is rotated, said apron being extended rearwardly into a curved forwardly facing delivery chute portion, and means for rotating the drum with the upper portion thereof moving rearwardly.

5. In an apparatus of the class described, the combination with a carriage, of an elongated drum rotatably mounted on said carriage and provided with a plurality of axially spaced annular series of pickup fingers springably connected thereto to normally project radially therefrom, a side delivery apron having a downwardly curved front portion disposed in generally concentric overhanging relation to said drum, and provided with a plurality of carrier members extending over and downwardly at the front of and in general concentric spaced relation to said drum and spaced to receive the series of pickup fingers between them as the drum is rotated, said carrier members extending below and rearwardly of the drum, said apron having a forwardly facing delivery chute portion, and means for rotating the drum with the upper portion thereof moving rearwardly, said chute portion being disposed at the rear of the drum and adjacent thereto for delivery by said pickup fingers substantially directly into the chute portion as the pickup fingers move rearwardly with the upper portion of the drum, the chute portion being downwardly and rearwardly inclined to deliver downwardly and rearwardly from one side of the carriage to the opposite side thereof, the lower end of the chute extending to a level substantially below that of the top of the drum.

6. In an apparatus of the class described, the combination with a carriage, of an elongated drum rotatably mounted on said carriage and provided with a plurality of axially spaced annular series of pickup fingers springably connected thereto to normally project radially therefrom, a side delivery apron having a downwardly curved front portion disposed in generally concentric overhanging relation to said drum, and provided with a plurality of carrier members extending over and downwardly at the front of and in general concentric spaced relation to said drum and spaced to receive the series of pickup fingers between them as the drum is rotated, said apron having a forwardly facing delivery chute portion, and means for rotating the drum with the upper portion thereof moving rearwardly, said chute portion being disposed at the rear of the drum and adjacent thereto for delivery by said pickup fingers substantially directly into the chute portion as the pickup fingers move rearwardly with the upper portion of the drum, the chute portion being downwardly and rearwardly inclined to deliver downwardly and rearwardly from one side of the carriage to the opposite side thereof, the lower end of the chute extending to a level substantially below that of the top of the drum.

7. In an apparatus of the class described, the combination with a carriage, of an elongated drum rotatably mounted on said carriage and provided with a plurality of axially spaced annular series of pickup fingers, a side delivery apron disposed in overhanging relation to said drum, and provided with a plurality of carrier members extending over and downwardly at the front of said drum and spaced to receive the series of pickup fingers between them as the drum is rotated, said apron having stripper elements coacting with said fingers, said apron being extended rearwardly into a curved forwardly facing delivery chute portion, and means for rotating the drum with the upper portion thereof moving rearwardly, said chute portion extending downwardly and rearwardly from one side of the carriage to the opposite side thereof to deliver downwardly and rearwardly and being disposed adjacent the drum for delivery by said pickup fingers directly into the chute as said pickup fingers move rearwardly with the upper portion of the drum, said stripper elements being disposed adjacent the forward portion of the chute to strip the picked up material from the fingers prior to delivery into the chute.

8. In an apparatus of the class described, the combination with a carriage, of an elongated drum rotatably mounted on said carriage and provided with a plurality of axially spaced annular series of pickup fingers, a side delivery apron disposed in overhanging relation to said drum, and provided with a plurality of carrier members extending over and downwardly at the front of said drum and spaced to receive the series of pickup fingers between them as the drum is rotated, said apron being extended rearwardly into a curved forwardly facing delivery chute portion, and means for rotating the drum with the upper portion thereof moving rearwardly, said apron and the chute portion thereof being of sheet material providing a substantially continuous supporting and guiding surface for the picked up material between the apron and chute portion thereof, the chute portion being disposed closely adjacent the drum for delivery by the pickup fingers substantially directly into the chute portion as the fingers move rearwardly with the upper portion of the drum, said chute portion being downwardly inclined from one side of the carriage to the opposite side thereof to deliver at one side of the carriage.

9. In an apparatus of the class described, the combination with a carriage, of an elongated drum rotatably mounted on said carriage and provided with a plurality of axially spaced annular series of pickup fingers, a side delivery apron disposed in overhanging relation to said drum, and provided with a plurality of carrier members extending over and downwardly at the front of said drum and spaced to receive the series of pickup fingers between them as the drum is rotated, said apron having stripper elements coacting with said fingers, said apron being extended rearwardly into a curved forwardly facing delivery chute portion, and means for rotating the drum with the upper portion thereof moving rearwardly, said chute portion being disposed adjacent the rear of the drum for delivery by said pickup fingers substantially directly into the chute as the top portion of the drum moves rearwardly, said stripper elements being disposed adjacent the forward portion of the chute to strip the picked up material therefrom before delivery into the chute portion, said chute portion being downwardly inclined to deliver by gravity from one side of the carriage to the opposite side thereof.

10. In an apparatus of the class described, a carriage supported for traveling movement, a pick-up mechanism including pickup fingers and a delivery chute, said pick-up mechanism and delivery chute being supported on said carriage, the delivery chute extending transversely the direction of travel of the carriage and being disposed rearwardly of the pick-up mechanism and opening upwardly and forwardly to receive from the pick-up mechanism, the chute being disposed to guidingly direct the material downward and rearward from one end of the chute at one side of the carriage to the opposite end of the chute at the opposite side of the carriage, said delivery chute being disposed adjacent the pickup mechanism for delivery by the pickup fingers directly into the chute.

EDWIN JAY WHITNEY.

References Cited in the file of this patent

UNITED STATES PATENTS

| Number | Name | Date |
|---|---|---|
| 186,346 | Huber et al. | Jan. 16, 1877 |
| 749,512 | Anderson | Jan. 12, 1904 |
| 1,847,399 | Innes | Mar. 1, 1932 |
| 1,850,458 | Hyman | Mar. 22, 1932 |
| 2,172,655 | Gallagher et al. | Sept. 12, 1939 |
| 2,284,777 | Sund | June 2, 1942 |
| 2,398,389 | Oehler | Apr. 16, 1946 |
| 2,480,777 | Schwartz | Aug. 30, 1946 |
| 2,488,738 | Pool | Nov. 22, 1949 |
| 2,529,577 | Schempp et al. | Nov. 14, 1950 |